United States Patent Office 3,238,170
Patented Mar. 1, 1966

3,238,170
AQUEOUS COATING COMPOSITION COMPRISING A POLYEPOXIDE AND AN ALKALI SOLUBLE COPOLYMER
Norwin Wolff, Cambridge, and Thomas B. Pitrolffy-Szabo, Boston, Mass., assignors to A. E. Staley Manufacturing Company, Decatur, Ill., a corporation of Delaware
No Drawing. Filed Oct. 8, 1962, Ser. No. 229,220
17 Claims. (Cl. 260—29.6)

This application is a continuation-in-part of application Serial No. 196,334, filed May 21, 1962.

This invention relates to a novel composition of matter and more particularly, to a composition of matter capable of producing glossy, continuous, alkali-resistant coatings, the composition comprising an alkaline solution of a water-soluble or readily water-dispersible polyepoxide and dissolved thermoplastic copolymer of an alkyl ester of an alpha, beta-ethylenically unsaturated monocarboxylic acid and an alkyl half ester of itaconic acid.

In application, Serial No. 196,334, filed May 21, 1962, there are disclosed unique thermoplastic copolymers which dissolve in alkali to form low viscosity solutions. As pointed out in the above application, these copolymers have the following characteristics: (1) can be produced by emulsion polymerization, (2) can be produced in an aqueous medium, (3) can be dissolved at moderately high total solids in dilute alkali without appreciably increasing the viscosity of the polymeric system, (4) can be dissolved at moderately high total solids in alkali to form a viscous polymeric system, (5) can be shipped in either the emulsified form or the solution form at high total solids, (6) can be coated as a water-thin solution or as a viscous solution at moderately high total solids depending upon the desire of the coater, (7) form freeze-thaw stable solutions. The significance of each of these properties is pointed out in the above application. While the above copolymers have all the foregoing advantages, their applied coatings are too alkali sensitive for some uses. The principal object of this invention is to provide an aqueous alkaline solution of a high molecular weight copolymer of an alkyl ester of an alpha, beta-ethylenically unsaturated mono-carboxylic acid and a water-soluble or water-dispersible polyepoxide, which forms alkali resistant coatings.

As pointed out in the above application, the first of the principal components of this invention is a copolymer produced by the aqueous emulsion copolymerization of a monoalkyl ester of itaconic acid and an alkyl ester of an alpha, beta-ethylenically unsaturated monocarboxylic acid. The monoalkyl esters of itaconic acid contain from 1 to 18 carbon atoms in the alkyl group and can be represented by the formula:

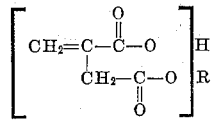

wherein R is a monovalent alkyl group of from 1 to 18 carbon atoms, such as methyl and stearyl. Preferably, R is an unsubstituted alkyl group of from 4 to 8 carbon atoms, such as butyl, hexyl, octyl and 2-ethylhexyl. A particularly preferred class of these copolymers contains monomethyl ester of itaconic acid and a monoalkyl ester of itaconic acid having from 4 to 8 carbon atoms in the alkyl group. As pointed out in the above application, the total of monoalkyl ester of itaconic acid can comprise from about 5 to 50 mole percent of the polymerizable monomers, and preferably, from about 8 to 20 mole percent.

The alkyl esters of alpha, beta-ethylenically unsaturated monocarboxylic acid which comprise from about 40 to 95 mole percent of the monomeric units in the copolymer include "soft monomers" such as methyl acrylate, ethyl acrylate, isopropyl acrylate, butyl acrylate, amyl acrylate, hexyl acrylate, heptyl arcrylate, 2-ethylhexyl acrylate, butyl methacrylate, amyl methacrylate, dodecyl methacrylate, etc., and "hard monomers" such as methyl methacrylate, tertiary butyl methacrylate, cyclohexyl acrylate, hydroxyethyl methacrylate, etc., which can be represented by the formula:

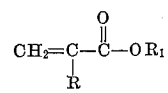

wherein R is methyl or hydrogen; when R is methyl, $R_1$ is an alkyl group of from 1 to 12 carbon atoms and when R is hydrogen, $R_1$ is an alkyl group of from 1 to 8 carbon atoms. The term "soft" is used herein in referring to polymers formed from the monomer alone, in the way that is common in this technology. (See Riddle "Acrylic Esters," Reinhold Publishing Co., 1954, pp. 58, et seq. Also Patent No. 2,795,564). Generally, this refers to the "brittle point" of the polymer, i.e., temperature at which the polymer breaks upon flexing. Polymers of the soft alkyl esters of an alpha, beta-ethylenically unsaturated monocarboxylic acid have brittle points below about 20° C., while the hard esters have brittle points above 20° C.

In general, the alkyl esters are soft monomers in the above formula when R is hydrogen (acrylic esters) and $R_1$ is a primary or secondary alkyl group of from 1 to 8 carbon atoms or when R is methyl (methacrylic esters) and $R_1$ is a primary or secondary alkyl group of from 4 to 12 carbon atoms. On the other hand, the alkyl esters are hard monomers in the above formula when R is hydrogen and $R_1$ is a tertiary alkyl group or a cycloalkyl group or when R is methyl and $R_1$ is an alkyl group of from 1 to 3 carbon atoms, a tertiary alkyl group or a cyclo alkyl group.

As explained in the above application, various other dissimilar copolymerizable ethylenically unsaturated co-monomers, such as styrene, vinylidene chloride, allyl alcohol, stearyl methacrylate, isoprene, dibutyl itaconate, dimethyl itaconate, etc., can comprise up to about 20 to 40 mole percent of the monomeric units in the copolymer.

While the copolymer can be composed solely of a monoalkyl ester of itaconic acid and a single alkyl ester of an alpha, beta-ethylenically unsaturated monocarboxylic acid, the preferred copolymers contain at least some soft alkyl ester of an alpha, beta-ethylenically unsaturated monocarboxylic acid and some hard alkyl ester of an alpha, beta-ethylenically unsaturated monocarboxylic acid in addition to the monoalkyl ester of itaconic acid, in order to give the copolymers and coatings based thereon proper balance of hardness, freedom from tack, gloss, flexibility, etc. These copolymers preferably contain from about 20 to 87 mole percent of a soft alkyl ester (preferably at least some ethyl acrylate) from about 5 to 60 mole percent of a hard alkyl ester, and from about 8 to 20 mole percent of a monoalkyl ester of itaconic acid, the total being 100%.

As explained in the above application, the acidic emulsion copolymer can be dissolved by adding alkali to the emulsion to a pH of about 7.2 to 8.0 (clear point pH) to form water-thin clear solutions or at a higher pH (above the clear point) to form water-thin to viscous solutions. Suitable basic compounds include alkali metal hydroxides such as sodium hydroxide and potassium hydroxide; ammonium hydroxide; amines such as methyl amine, diethyl amine, triethyl amine, tetramethyl ammonium hydroxide; etc. The preferred source of alkali is ammonium hydroxide although morpholine, which is also volatile, is only slightly less preferred.

The second principal component in accordance with this invention is a water-soluble or easily water dispersible polyepoxy compound such as the diglycidyl ether of ethylene glycol, diglycidyl ether of propylene glycol, diglycidyl ether of trimethylene glycol, the diglycidyl ether of polyoxyethylene glycol, Unox 201 (3,4-epoxy-6-methylcyclohexylmethyl 3,4-epoxy-6-methylcyclohexanecarboxylate), Unox 206 (vinylcyclohexene dioxide), etc. All of these polyepoxides contain at least 2 vicinal epoxy groups in which the epoxy oxygen atom is attached to adjacent carbon atoms. The ratio of the polyepoxide to the copolymer of this invention may be varied over a wide range. For instance, one may use between about 0.1 and 50% by weight of polyepoxide (preferably 2–10% by weight) to the corresponding 99.9% to 50% by weight of the copolymer.

Besides the alkali soluble copolymer and polyepoxide, the aqueous system may contain a small amount of a catalyst for the reaction of the acid copolymer with the epoxide, preferably a $BF_3$ complex, stannic chloride or an aliphatic amine, such as any of the amines mentioned above that can be used to make salts of the acid copolymers, or pyridine, benzylamine, benzyldimethyl amine, 1,8-diamine-para-menthane, and N-substituted derivatives thereof obtained by alkylation such as tetra-methyl-1,8-diamino para-menthane and N,N-dimethyl-1,8-diamino para-menthane, or a poly-alkylene polyamine, such as ethylene diamine, diethylene triamine, triethylene tetramine, etc. When a catalyst is used, it may be used in an amount of about 1 mole percent or more based on the monoalkyl itaconate units of the copolymer.

Depending upon the particular method of application, the concentration of the composition may vary widely. For example, the solution of the copolymer and polyepoxide may contain from 1% up to about 50% by weight of the mixture of the copolymer and polyepoxide (solids). For coating purposes, the composition may be applied by spraying, dipping, brushing, roll-transfer or in any other suitable manner.

After application of the composition to a surface, it may be allowed to dry simply by exposure to normal atmospheric air currents. Alternatively, it may be dried by application of heated air, by application of infra-red rays, radio frequency currents, or in any other suitable manner. After drying or during drying, curing is effected by heating to a tempeature of about 50° C. to 200° C. or higher for a period of time that generally varies inversely with the temperature and may be from 10 seconds to an hour or so. The combined factors of temperature and time depend upon the particular substrate used and thickness of coating.

The composition may be pigmented if clear coatings are not desired. For this purpose there may be incorporated into the composition an amount of pigment, extender, filler delustrant, or the like, such that the weight ratio of the binder solids (epoxides and copolymer) to pigment is 20 to 1 to 1 to 20 depending upon the particular effect desired. Any pigments which are not sensitive to the acid groups of the copolymer may be employed including titanium dioxide, ultramarine blue, zinc oxide, zinc sulfite, barium sulfate, calcium carbonate, zinc chromate, carbon black, etc.

The coatings may be applied to all sorts of surfaces for a wide variety of purposes. They are particularly desirable for application to the surface of metals, such as iron, steel, copper, brass, aluminum, chromium, nickel and the like; to glass, porcelain, other ceramic materials; to articles made of plastic materials such as polyesters, polymers of alkyl acrylates and methacrylates, such as methyl methacrylate or copolymers thereof; wood, textile fabrics, leather, paper, cardboard, etc.

The compositions of the present invention are adapted for the pigment-printing and dyeing of textiles, or finishing of textile fabrics and coating papers with either pigmented or clear coatings or surface sizing. They are characterized by excellent adhesion to all sorts of substrates, but especially to metals and glass, by good gloss, by hardness, by resistance to attack by solvents, by resistance to heat, by resistance to ultra-violet light, and are further characterized by good cohesion, compatibility, clarity and strength.

The following examples are merely illustrative of the invention and should not be construed as limiting the scope of the invention. The copolymers described were prepared by the method of the copending application referred to before.

*Example 1*

An ammoniacal solution of 25% by weight of a copolymer composed of 10.6 mole percent monobutyl itaconate, 56.7 mole percent ethyl acrylate and 32.7 mole percent of methyl methacrylate, and 1% by weight Unox 201 was coated on an aluminum substrate and cured at 70° C. for 10 minutes. The clear film had excellent adhesion to the substrate and excellent resistance to aqueous sodium hydroxide. Aqueous ammoniacal solutions of the copolymer and Unox 201 have been kept stable for over a month at room temperature.

*Example 2*

An aqueous ammoniacal solution of 25% by weight of the copolymer of Example 1 and 1% by weight of Unox 206 was coated on an aluminum substrate and cured at 70° C. for 10 minutes. The clear film had excellent adhesion to the substrate and excellent resistance to aqueous sodium hydroxide.

*Example 3*

An aqueous ammoniacal solution of 25% by weight of a copolymer composed of 9.7 mole percent monobutyl itaconate, 1.4 mole percent monomethyl itaconate, 15.1 mole percent ethyl acrylate, 15.1 mole percent methyl methacrylate and 58.6 mole percent methylacrylate, and 0.75% by weight Unox 206 was coated on linoleum, and dried at room temperature for 72 hours. The clear glossy coating had excellent adhesion to the substrate and was alkali resistant.

*Example 4*

Example 3 was repeated using the copolymer of Example 1. A somewhat softer coating resulted from the replacement of the copolymer of Example 3 with the copolymer of Example 1.

*Example 5*

An ammoniacal solution of 17.5% by weight of a copolymer composed of 10.6 mole percent monobutyl itaconate, 67.6 mole percent ethyl acrylate, and 21.8 mole percent methyl methacrylate, and 1.4 parts Unox 201 was applied as a release coating to the back of a rib paper for masking tape. A 2½ mil thick film was cured at 100° C. for 2½ minutes, forming an excellent release coating for pressure sensitive adhesives.

*Example 6*

Example 5 was repeated using a 188° C. cure for 20 seconds.

*Example 7*

Example 5 was repeated except that Unox 206 was employed instead of Unox 201 with essentially the same results.

*Example 8*

Example 6 was repeated except that Unox 206 was employed instead of Unox 201 with essentially the same results.

Example 9

This example illustrates the preparation of a paint formulation using Unox 201 and a copolymer composed of 10.6 mole percent monobutyl itaconate, 56.7 mole percent ethyl acrylate and 32.7 mole percent methyl methacrylate as the primary vehicle. The following pigment dispersion was prepared:

| | | |
|---|---|---|
| Above Copolymer (20% T.S., pH 9) | 30 | 150 |
| Water | | 40 |
| Methyl Carbitol | | 20 |
| Daxad 30 | 2 | 6 |
| Antifoamer NDW | 0.5 | 0.5 |
| Ti Pure R-900 (Titanium Dioxide) | 250 | 250 |
| Sodium pyrophosphate | 0.5 | 0.5 |

The above 60% solids composition was ball milled for eight hours. Forty-two parts (dry weight) of the pigment dispersion was compounded with an additional 27.4 parts (dry weight) of the above copolymer, 0.20 part methyl carbitol and 0.10 part antifoamer NDW. After the paint composition was diluted with water to 40% total solids and adjusted to pH 8.2 with ammonia; 0.10 part Unox 201 and 0.25 part methyl cellulose acetate were added. The applied paint, after drying, had a gloss rating of 46 on a Gardner 60° Gloss Meter, excellent hiding power, excellent leveling and excellent water resistance.

Example 10

Example 9 was repeated with essentially the same result except that the concentration of Unox 201 was increased to 0.20 part and the concentration of methyl cellulose acetate was increased to 0.37 part. The Gardner 60° Gloss Meter reading was 52.

Since many embodiments of this invention may be made and since many changes may be made in the embodiments described, the foregoing is to be interpreted as illustrative only, and our invention is defined by the claims appended hereafter.

We claim:

1. A composition of matter capable of producing glossy, continuous, alkali-resistant coatings comprising an aqueous, alkaline solution of (1) 50% to 0.1% by weight of a dissolved polyepoxy compound and (2) 50% to 99.9% by weight of a dissolved emulsion copolymer comprising as its two essential monomers from 95 to 40 mole percent of an alkyl ester of an alpha, beta-ethylenically unsaturated monocarboxylic acid and from 5 to 50 mole percent of an alkyl half-ester of itaconic acid wherein said two essential monomers comprise at least 60 mole percent of said copolymer.

2. A composition of matter capable of producing glossy, continuous, alkali-resistant coatings comprising an aqueous, alkaline solution of (1) 50% to 0.1% by weight of a dissolved polyepoxy compound and (2) 50% to 99.9% by weight of a dissolved emulsion copolymer comprising as its two essential ingredients from 95 to 40 mole percent of an alkyl ester of an alpha, beta-ethylenically unsaturated monocarboxylic acid and from 5 to 50 mole percent of an alkyl half-ester of itaconic acid comprising an alkyl half-ester of itaconic acid having from 4 to 8 carbon atoms in said alkyl half-ester group, wherein said essential two monomers comprise at least 60 mole percent of said copolymers.

3. The composition of claim 2, wherein said copolymer comprises a soft alkyl ester of an alpha, beta-ethylenically unsaturated monocarboxylic acid and a hard alkyl ester of an alpha, beta-ethylenically unsaturated monocarboxylic acid.

4. The composition of claim 2 wherein said solution is an ammoniacal solution.

5. The composition of claim 3 wherein said copolymer comprises ethyl acrylate and methyl methacrylate.

6. The composition of claim 3 wherein said polyepoxy compound comprises vinyl cyclohexene dioxide.

7. The composition of claim 3 wherein said polyepoxy compound comprises 3,4-epoxy-6-methylcyclohexylmethyl 3,4-epoxy-6-methylcyclohexanecarboxylate.

8. The process of forming alkali resistant glossy coatings which comprises depositing on a substrate a thin film of an aqueous solution of a composition comprising (1) 50% to 0.1% by weight of a dissolved polyepoxy compound and (2) 50% to 99.9% by weight of a dissolved emulsion copolymer comprising as its two essential monomers from 95 to 40 mole percent of an alkyl ester of an alhpa, beta-ethylenically unsaturated monocarboxylic acid and from 5 to 50 mole percent of an alkyl half-ester of itaconic acid wherein said two essential monomers comprise at least 60 mole percent of said copolymer, and drying said film.

9. The process of forming alkali resistant glossy coatings which comprises depositing on a substrate a thin film of an aqueous alkaline solution of a composition comprising (1) 50% to 0.1% by weight of a dissolved polyepoxy compound and (2) 50% to 99.9% by weight of a dissolved emulsion copolymer comprising at its two essential ingredients from 95 to 40 mole percent of an alkyl ester of an alpha, beta-ethylenically unsaturated mono-carboxylic acid and from 5 to 50 mole percent of an alkyl half-ester of itaconic acid comprising an alkyl half ester of itaconic acid having from 4 to 8 carbon atoms in said alkyl half-ester group, wherein said essential two monomers comprise at least 60 mole percent of said copolymers and drying said film.

10. The process of claim 9 wherein said alkali soluble copolymer comprises a hard alkyl ester of an alpha, beta-ethylenically unsaturated monocarboxylic acid and a soft alkyl ester of an alpha, beta-ethylenically unsaturated monocarboxylic acid.

11. The process of claim 9 wherein said solution is an ammoniacal solution.

12. The process of claim 9 wherein said copolymer comprises ethyl acrylate and methyl methacrylate.

13. The process of claim 9 wherein said polyepoxy compound comprises 3,4-epoxy-6-methylcyclohexylmethyl 3,4-epoxy-6-methylcyclohexanecarboxylate.

14. The process of claim 9 wherein said polyepoxy compound comprises vinyl cyclohexene dioxide.

15. A composition of matter capable of producing glossy, continuous, alkali-resistant coatings comprising an aqueous, alkaline solution of (1) 50% to 0.1% by weight of a dissolved polyepoxy compound and (2) 50% to 99.9% by weight of a dissolved emulsion copolymer comprising from about 20 to 87 mole percent of soft alkyl ester of an alpha, beta-ethylenically unsaturated monocarboxylic acid, from about 5 to 60 mole percent of hard alkyl ester of an alpha, beta-ethylenically unsaturated monocarboxylic acid and from about 8 to 20 mole percent of an alkyl half-ester of itaconic acid having from 1 to 18 carbon atoms in its alkyl group, the total being 100 percent.

16. The composition of claim 1, wherein said alkyl half-ester of itaconic acid comprises monomethyl itaconate and an alkyl half-ester containing from 4 to 8 carbon atoms in the alkyl group.

17. The composition of claim 1, wherein said alkly half-ester of itaconic acid comprises monobutyl itaconate.

References Cited by the Examiner

UNITED STATES PATENTS

| 2,954,358 | 9/1960 | Hurwitz | 260—29.6 |
| 3,037,881 | 6/1962 | McDowell | 260—29.6 |
| 3,062,686 | 11/1962 | Graulich et al. | 260—29.6 |

MURRAY TILLMAN, *Primary Examiner.*